June 24, 1930.  R. H. WAPPLER  1,767,267
CATHETERIZING INSTRUMENT
Filed April 20, 1929   3 Sheets-Sheet 1

INVENTOR
Reinhold H. Wappler;
BY
Frederick Greitenfeld
ATTORNEY

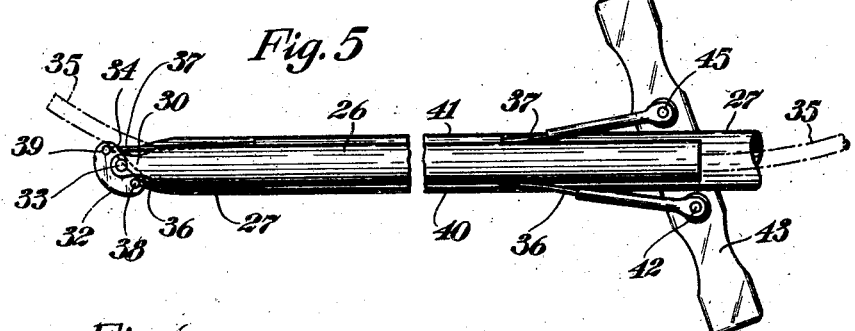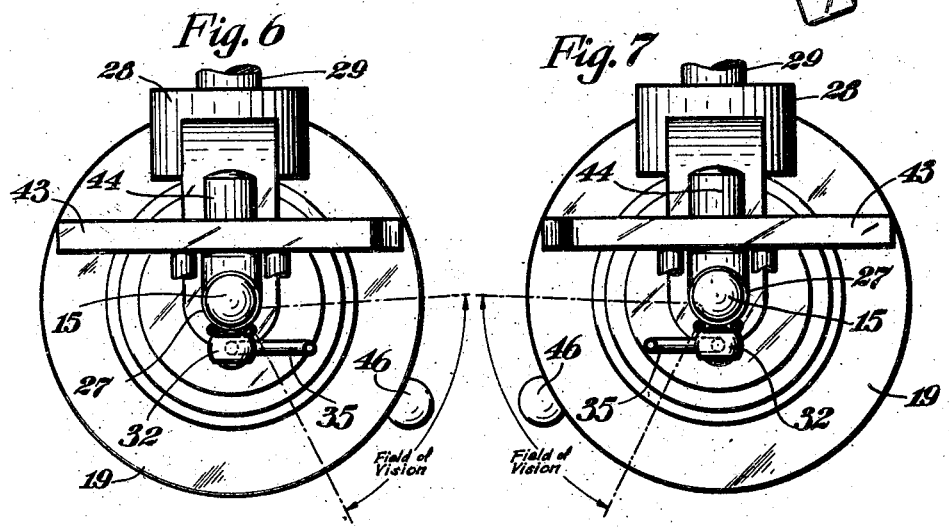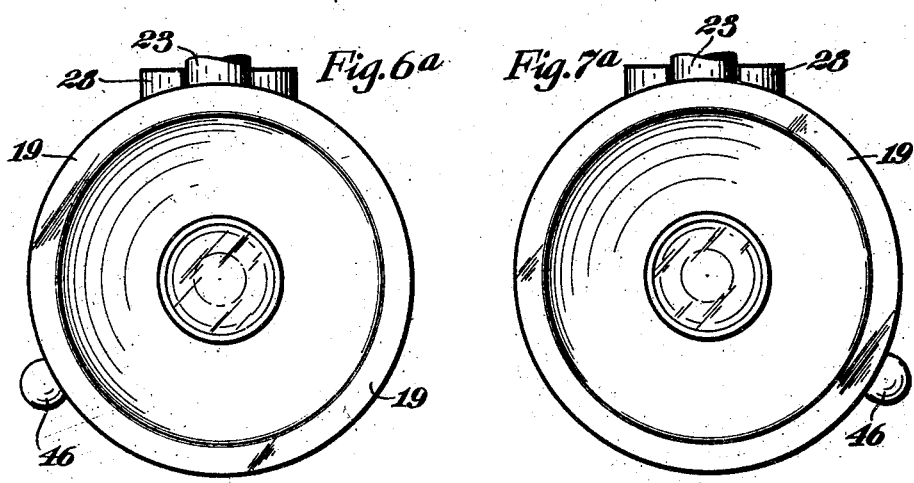

June 24, 1930. R. H. WAPPLER 1,767,267
CATHETERIZING INSTRUMENT
Filed April 20, 1929 3 Sheets-Sheet 3

INVENTOR
Reinhold H. Wappler;
BY
Frederick Breitenfeld
ATTORNEY

Patented June 24, 1930

1,767,267

UNITED STATES PATENT OFFICE

REINHOLD H. WAPPLER, OF YONKERS, NEW YORK

CATHETERIZING INSTRUMENT

Application filed April 20, 1929. Serial No. 356,812.

My present invention relates generally to surgical instruments, and has particular reference to a catheterizing instrument.

It is a general object of my invention to provide an improved instrument for insertion into various cavities and passages of the body for the purpose of catheterization. The type of instrument to which my invention relates is of the character which permits catheterization of the sinus morgagnii, the ejaculatory ducts, and similar inaccessible interior portions of the body, under illuminated vision.

It is old in the art to employ catheter tubes of varying characters in association with illuminating and telescopic devices. My present invention has particular reference to a novel and improved structural assembly of these elements whereby the efficient employment of catheters, bougies, electrodes, and the like is greatly facilitated. It is a particular object to provide a construction which is of suitable compactness and of sufficiently minute caliber to permit the satisfactory employment thereof in locations such as the sinus canals and follicles of the nose, and others which have heretofore presented difficulty because of the extremely minute dimensions thereof.

Although by no means limited to any specific application, my structure is peculiarly adapted for employment with a pair of adjacent and symmetrical passages. It is accordingly one object of my invention to provide a catheter tube with means for deflecting a catheter in a selected one or the other of two opposite lateral directions.

One general object lies in providing an assembly of illuminating telescope and catheter tube wherein the problem of promptly and efficiently bringing the catheter into the field of vision has been solved by various indicating devices and means associated with the outer end of the device as a whole. More particularly, my construction embodies a telescopic tube in association with a catheter tube arranged alongside, and I provide indicating means at the exterior of the device for constantly indicating the relative positions, at the interior end of the device, of the catheter tube axis and the field of vision commanded by the telescope. This structural feature, coupled with the means for deflecting a catheter into opposite directions at will, results in an instrument of great efficiency, capable of use with ease and dispatch and without necessitating any recourse to complicated adjustments and manipulations.

From a broader aspect, my invention relates to an improvement in catheter tubes per se, it being a particular object to provide an efficient, easily manipulable, and reliable means for deflecting a catheter with ease and precision into a number of directions, including opposite lateral directions. A particular feature lies in the provision of a control member which is so constructed as to indicate constantly, at the exterior or rear portion of the catheter tube, the manner in which the deflecting means is functioning.

A still further object of my invention lies in the provision of an improved telescope, and particularly an improved objective system therefor, whereby a lateral field of vision of greatly increased magnitude is capable of observation. Although it is a particular feature of my invention to provide this improved objective arrangement in conjunction with a catheterizing instrument of the foregoing character, whereby the accurate observation of the catheter or similar instrument in minute and inaccessible canals and passages is facilitated, nevertheless it will be understood that the objective system by itself is by no means limited to such a specific application and constitutes a valuable addition to the diagnostic instrument, art, in general.

For the attainment of the foregoing objects and such other objects as may hereinafter appear or be pointed out, I have constructed a device embodying the features of my invention and illustrated in the accompanying drawings wherein—

Figure 5 is a view of the parts shown in Figure 3 viewed from beneath, the telescope being omitted;

Figure 6 is an end view taken from the left of Figures 1-3 and partly diagrammatic, showing the relationship of the parts when the catheter is deflected in one direction under observation;

Figure 6A is an end view of the instrument taken from the right of Figures 1 and 2 during the conditions illustrated in Figure 6;

Figures 7 and 7A are views similar to Figures 6 and 6A illustrating the conditions which obtain when the catheter is deflected in an opposite direction;

Figure 2:
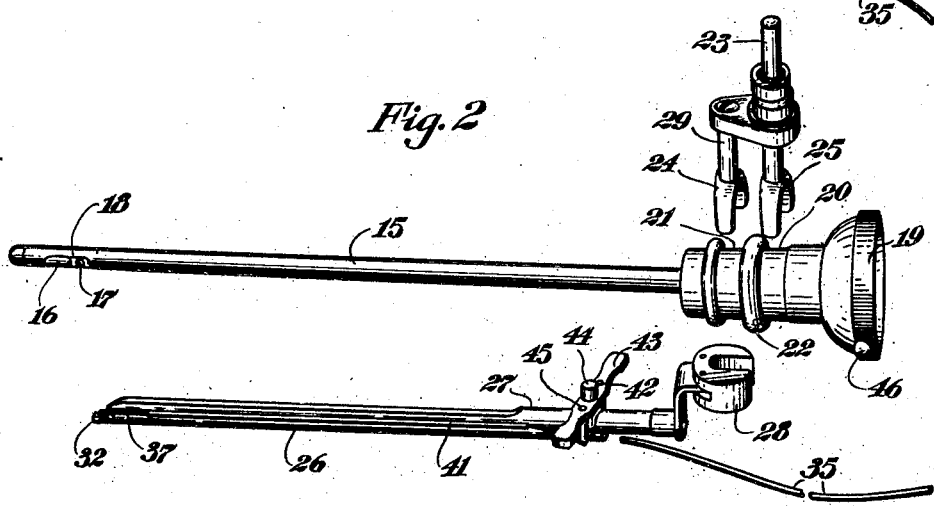
Figure 2 is an exploded view of the elements shown in Figure 1.

Referring for the moment to Figure 2, I will point out that the telescope which I have herein chosen for illustration consists of a straight tube 15 approximately one-eighth of an inch in diameter and provided at its inner end with a small incandescent lamp 16 and an objective 17. Both the lamp and the objective are so arranged in a suitably constructed lateral fenestrum 18 that the objective commands a lateral illuminated field of vision. At the rear end of the tube 15 various accessories are provided, among which is the eye-piece 19 and the metallic contact rings 20 and 21, the latter being separated by a ridge 22 and being electrically connected with the lamp 16.

For removable engagement with the contact rings 20 and 21 I provide a binding post 23 adapted to project radially from the telescope and to make contact with a suitable lead to a source of energy such as a battery. The binding post 23 is provided with the two downwardly projecting clamps or saddles 24 and 25 which engage frictionally around the rings 21 and 20 respectively to establish the necessary electrical contact therewith. When applied, the binding post 23 is rotatably mounted upon the outer end of the telescope.

The third element of my assembly consists of a catheter tube 26 carrying a parallel sleeve 27, the latter being slidably engageable around the telescope 15 to ensheathe the latter. Although the sleeve 27 may be completely tubular throughout its length, I have shown the forward portion thereof semicircular, it being understood that the term "sleeve" as used herein is not used in the limited sense of completely tubular. At the rear end of the sleeve 27 I provide a forked member 28 adapted to engage the depending leg 29 of the binding post in a snug yet removable manner. The forked member 28 thereby serves not only to separably attach the catheter tube 26 to the binding post 23 but serves also to limit the extent to which the sleeve 27 may be slid over the tube 15. When the forked member 28 engages the leg 29, the outlet end of the catheter tube is properly positioned with respect to the objective 17 and the field of vision commanded thereby.

Figure 3:
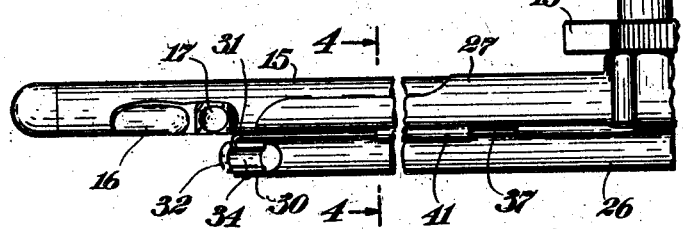
Figure 3 is a side view on an enlarged scale, with parts omitted for the sake of clearness and space, illustrating certain details of the catheter-deflecting mechanism.
Figure 4:
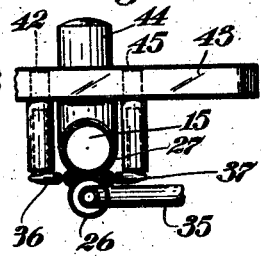
Figure 4 is a cross-sectional view taken substantially along the line 4—4 of Figure 3.

The catheter tube 26 is substantially straight and this characteristic is to be noted particularly with respect to the forward or outlet end thereof. At this end, the opposite walls of the tube 26 are extended to form the opposed ears 30 and 31. Mounted between these ears is an oscillatable abutment 32 whose configuration is somewhat semicircular as shown most clearly in Figure 5. This abutment 32 is positioned across the outlet end of the tube 26 so that any catheter advanced through the tube will encounter the same to be deflected thereby. More particularly, upon reference to Figure 5, it will be noted that the abutment 32 is medially pivoted as at 33 between the ears 30 and 31 and that it is provided with a catheter-deflecting surface 34 positioned toward the catheter tube. This mounting of the abutment 32 permits oscillation thereof about the point 33 so that the surface 34 may be brought into the position of Figure 5 wherein it extends obliquely forwardly from one edge of the catheter tube, or into a position at substantially right angles to that of Figure 5 wherein it extends obliquely forwardly from an opposite edge of the tube. When positioned as in Figures 3, 4, and 5, a catheter 35 will be deflected in the lateral direction illustrated.

For the purpose of controlling the oscillation of the abutment 32 I provide a pair of reach-rods 36 and 37 which parallel the tube 26 and are preferably positioned in a snug manner along the channel defined by the juncture of the sleeve 27 and the tube 26. The forward ends of the rods 36 and 37 are pivotally associated as at 38 and 39 with opposite portions of the abutment 32.

The rods 36 and 37 extend rearwardly and are preferably guided in small guide tubes 40 and 41 respectively, the rear ends of the rods diverging outwardly to a slight degree as shown most clearly in Figure 5. The rear end of the rod 36 is pivoted as at 42 to a double-armed member 43, the latter being medially pivoted as at 44 (see Figure 2) to the sleeve 27. The rear end of the rod 37 is similarly pivoted as at 45 to a symmetrically opposite point of the double-armed member 43. The member 43 is oscillatable between the full-line position of Figure 1 and the dotted-line position thereof, and it will be readily understood that this oscillation causes a similar oscillation of the abutment 32 by means of the interposed rods 36 and 37. It is to be particularly noted, for a purpose presently to be pointed out in greater detail, that the member 43 constantly parallels the abutment 32. Thus, in Figure 5, both the abutment 32 and the member 43 extend upwardly toward the left as viewed in this figure.

Figure 1:
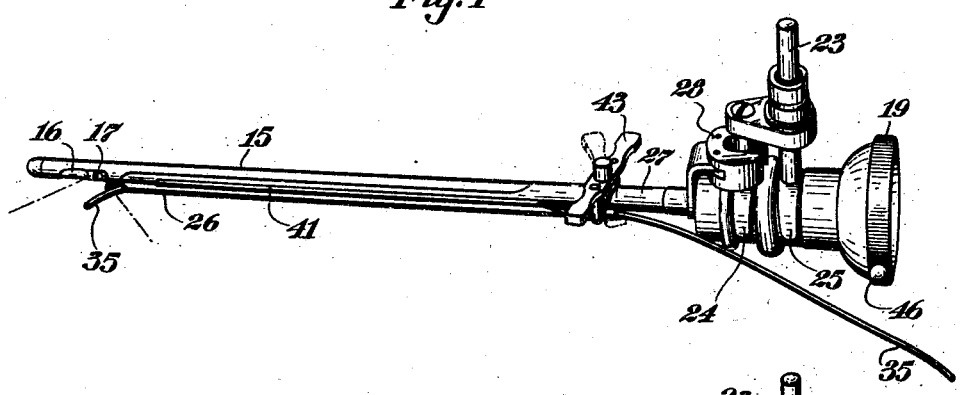
Figure 1 is a perspective view of my improved instrument with a catheter illustratively positioned within the catheter tube, this view being somewhat larger than actual size.

Before describing the other features of my invention, I will point out that manipulation of the control member 43 will determine the deflection of the catheter not only with respect to one or the other of opposite lateral directions, but also with respect to the particular degree of deflection in each lateral direction. For example, the catheter of Figure 1 is shown projecting toward the observer, being deflected in this direction by the abutment 32 positioned as shown in Figures 1-5; but this deflection may be accurately controlled and varied by proper adjustment of the control member 43. As long as the catheter projects from the outlet end of the catheter tube, adjustment of the member 43 simply varies the extent or degree of lateral deflection. It is possible, however, by withdrawing the catheter behind the abutment 32 and thereupon swinging the control member 43 into the opposite inclination, as shown in dotted lines in Figure 1, to cause the catheter thereafter to deflect in the opposite lateral direction. In Figure 1, this opposite lateral direction would be away from the observer, and here too, the particular degree or extent could be accurately controlled by adjustments of the control member 43.

I have stressed the manner of deflecting the catheter because although it is old in the art to provide a mechanical deflector which controls the degree of deflection, I believe I am the first to provide a deflecting abutment which accomplishes not only this old function but also permits the same to be accomplished in two opposite lateral directions. Furthermore, this possibility of deflecting the catheter in one or the other of opposite lateral directions, and of accurately controlling the degree of deflection in each case, is of primary importance in connection with the employment of my instrument with symmatrically arranged passages such as those encountered in the sinuses.

I will now point out the salient advantageous characteristics of my construction with respect to the greatly facilitated employment of my device.

At the outer end of the telescope 15, and preferably on the rim of the eye-piece 19, I provide a marker such as the knob or button 46, this marker being fixedly associated with the telescope and being preferably in a plane passing through the axis of the telescope and through the axis of the commanded field of vision. The method of associating the catheter tube 26 with the telescope 15 permits the catheter tube to rotate about the axis of the telescope, or, stated otherwise, the telescope itself is rotatable about its own axis. The extent of this rotation is constantly capable of indication by the position of the marker 46. And the mutual interlocking of the catheter tube and the binding post 23 conveniently establishes a relatively fixed point or direction with respect to which the rotation of the telescope about its own axis may be measured. In other words, the positional relationship at the outer end of the device between the marker 46 and the binding post 23 serves as a constant indication of the positional relationship, at the inner end of the device, between the catheter tube axis and the field of vision commanded by the telescope.

The importance of this means for indicating such relationship will be more fully appreciated upon reference to Figures 6-7A. In Figures 6 and 6A the control member 43 is in the same position as in Figures 1-5, and as a result, the catheter projects toward the right in Figure 6. To bring this catheter within the field of vision without any necessity for hunting therefor, it is only necessary for the operator, who views the instrument as a whole as shown in Figure 6A, to bring the knob or marker 46 into the positional relationship shown in Figure 6A with respect to the binding post 23. It is to be noted that this relationship might be defined as that between the hands of a clock at eight o'clock; the binding post 23 extends upwardly and corresponds to the minute hand of the clock, and the marker 46 extends downwardly to the left and corresponds to the hour hand of the clock. The operator knows that this relationship must be effected in order to view the catheter because of the position assumed by the double-armed control member 43. This position, as the operator looks at the same, indicates that the catheter is being deflected in the direction shown in Figure 6. As a matter of fact, the control member 43 practically points in the direction in which the catheter is deflected (see Figure 1).

If the operator swings the control member 43 into the other position (indicated by dotted lines in Figure 1) the inserted catheter will be deflected in the opposite lateral direction, i. e., toward the left of Figure 7. Upon observing the position of the control member 43, the operator knows at once that the marker 46 must be swung into the "4 o'clock" position shown in Figure 7A, and when he accomplishes this he automatically shifts the field of vision so as to bring the catheter within it as shown in Figure 7.

It will thus be seen that the means for deflecting the catheter at will into one or the other lateral direction, though an important improvement by itself, partakes of a far greater value in conjunction with the means at the exterior end of the instrument for promptly and efficiently adjusting the telescope into that particular position which will bring the catheter into vision, whatever the direction may be, into which it has been deflected. From the foregoing, it will be obvious that this advantageous result has been achieved by adapting the binding post, rotatable upon the telescope end, as a marker and providing for the interlocking thereof with the catheter tube, and by simultaneously providing a marker on the telescope and movable with the latter.

Figure 8:
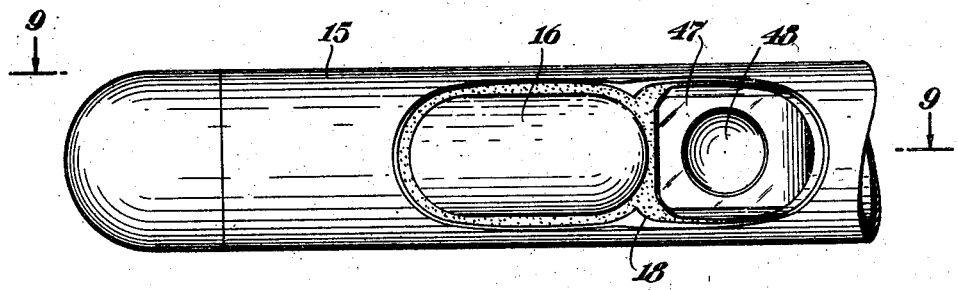
Figure 8 is an enlarged view of the inner end of the telescope.
Figure 9:
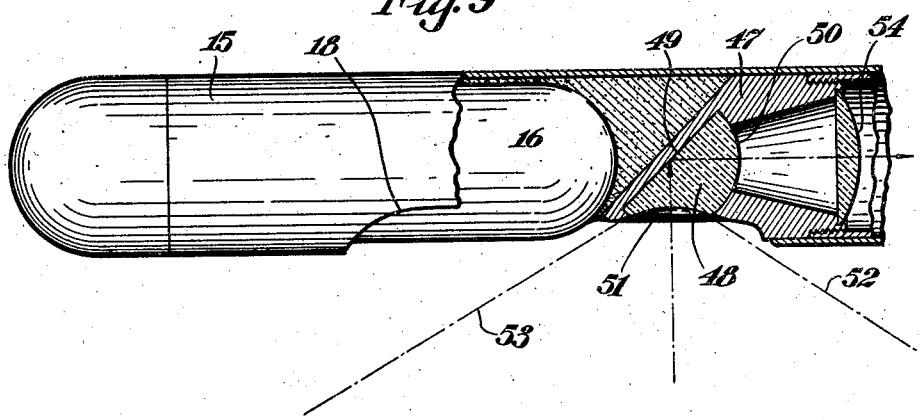
Figure 9 is a cross-sectional view taken substantially along the line 9—9 of Figure 8.
Figure 10:
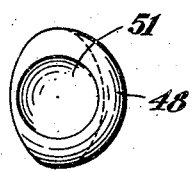
Figure 10 is a perspective view of the objective lens body by itself.

Although any telescope of the general character illustrated may be employed, I prefer to employ one of the character illustrated in Figure 2 and whose objective system is preferably of the character shown in Figures 8–10. Since the utility of my instrument is greatly increased by an increase of the field of vision commanded by the objective, but since the size of the instrument must be kept down to a minimum, I provide an objective system which is not only compact and simple in structural nature but which efficiently broadens the field of vision by about 100%, as compared with the fields heretofore available.

In Figure 8 the forward end of the telescope 15 has been shown upon a greatly enlarged scale, and this view is taken from directly in front of the fenestrum 18. Directly behind the rear end of the lamp 16 a mounting 47 accommodates the objective heretofore referred to generally by the reference numeral 17. This objective is more clearly illustrated in Figures 9 and 10 and consists of a substantially hemispherical lens body 48 whose plane surface 49 is directed forwardly and arranged oblique to the telescope axis. This positions one portion 50 of the spherical surface of the body 48 across the telescope axis, and a second portion 51 across the fenestrum 18. The portion 51 is a light-receiving surface and in accordance with my present invention it is concave, whereby a field of vision having approximately the outer limits 52 and 53 is commanded. The light entering the light-receiving surface 51 from this field of vision is directed onto the plane surface 49 in the rear, and is internally reflected by the latter in a direction which causes the same to leave the lens body 48 through the convex surface 50. The latter serves as a convex lens and cooperates with the other lenses of the optical system, particularly the auxiliary plano-convex lens 54 illustrated in Figure 9.

I do not mean to restrict myself to any particular method of mounting the objective, but I have found it satisfactory to employ the mounting 47 shaped substantially as shown in Figure 9 and accommodating in an efficient manner both the lens body 48 and the auxiliary back lens 54.

In Figure 10 the objective lens body has been shown by itself. It is substantially hemispherical and has a portion of the spherical surface thereof concaved adjacent to the plane surface 49 thereof.

It will thus be seen that I have provided an instrument which is simple in construction, sufficiently small and compact for a variety of specialized uses, and capable of efficient and reliable operation without any annoying adjustments and manipulations. It is of particular value in dispensing entirely with any necessity for withdrawing the catheter tube once it has been applied, and in avoiding any necessity for haphazardly searching for the catheter to bring the same into the field of vision. Without even looking through the eyepiece 19, the operator is enabled with facility and dispatch to adjust the control member 43 and rotate the telescope 15 to accomplish at once a deflection in the desired lateral direction and into the illuminated field of vision.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a catheterizing instrument, the combination of a telescope having at its inner end an objective which commands a lateral field of vision, a catheter tube mounted alongside of the telescope and rotatable about the axis of the latter, and means on the outer end of the telescope for constantly indicating the position of the catheter tube axis relative to the field of vision.

2. In a catheterizing instrument, the combination of a telescope having at its inner end an objective which commands a lateral field of vision, a catheter tube mounted alongside of the telescope and rotatable about the axis of the latter, and means on the outer end of the telescope for constantly indicating the position of the catheter tube axis relative to the field of vision; said means comprising a marker fixedly carried by the telescope and an element adjacent thereto and movable with the catheter tube.

3. In a catheterizing instrument, the combination of a telescope having at its inner end an objective which commands a lateral field of vision, a catheter tube mounted alongside of the telescope and rotatable about the axis of the latter, and means on the outer end of the telescope for constantly indicating the position of the catheter tube axis relative to the field of vision; said means comprising a marker fixedly carried by the telescope and a rod movable with the catheter tube and rotatably mounted on the telescope.

4. In a catheterizing instrument, the combination of a telescope having at its inner end an objective which commands a lateral field of vision, a catheter tube mounted alongside of the telescope and rotatable about the axis of the latter, and means on the outer end of the telescope for constantly indicating the position of the catheter tube axis relative to the field of vision; said means comprising a marker fixedly carried by the telescope and an element adjacent thereto and movable with the catherter tube; said element comprising a rod projecting radially from said telescope and means carried by the rod for rotatably mounting the same upon the outer end of the telescope.

5. In a catheterizing instrument, the combination of a telescope having at its inner end an objective which commands a lateral field of vision, and a lamp; a catheter tube mounted alongside of the telescope and rotatable about the axis of the latter; a marker on the outer end of the telescope; a contact ring on the outer end of the telescope and electrically connected with said lamp; a radially projecting binding post rotatably mounted on said contact ring; and means for attaching said catheter tube to said binding post, whereby the positional relationship of binding post to marker will constantly indicate at the outer end of the instrument the positional relationship at the inner end thereof of the catheter tube axis and the field of vision.

6. In a catheterizing instrument, the combination of a telescope having at its inner end an objective which commands a lateral field of vision, and a lamp; a catheter tube alongside of the telescope, a sleeve carrying the catheter tube and frictionally ensheathing the telescope so as to render the catheter tube rotatable about the telescope axis; a marker and a contact ring on the outer end of the telescope, the ring being in electrical connection with the lamp; a binding post rotatably mounted on said contact ring; and a forked member carried by said sleeve and adapted to engage said binding post; whereby the positional relationship of catheter tube axis to field of vision will always be indicated at the outer end of the telescope by the positional relationship of said binding post and marker.

7. In a catheterizing instrument, the combination of a telescope having at its inner end a lamp and an objective which commands a lateral field of vision and having at its outer end a contact member for said lamp and a fixed marker; a sleeve removably applicable to the telescope and adapted to rotatably ensheathe the latter when applied; a catheter tube carried by said sleeve and skirting said telescope; a binding post removably applicable to said contact member and adapted to rotatably engage the latter when applied; and means for interlocking said sleeve and binding post so that the positional relationship of said binding post and said marker will indicate the position of the catheter tube axis with respect to said field of vision.

8. In combination with a catheter tube, a movable abutment positioned across the outlet end thereof and having a rear catheter-deflecting surface, said abutment being mounted for movement between two positions in which said surface extends obliquely forwardly from diametrically opposite points on said outlet end.

9. In combination with a catheter tube, a movable abutment positioned across the outlet end thereof and having a rear catheter-deflecting surface, said abutment being mounted for oscillation between two positions in one of which said surface extends obliquely forwardly from one point on said outlet end so as to deflect a catheter in one lateral direction, and in the other of which said surface extends obliquely forwardly from a diametrically opposite point on said outlet end so as to deflect the catheter in the opposite lateral direction.

10. In combination with a catheter tube, a movable abutment positioned across the outlet end thereof for encounter by a catheter advanced through the tube, said abutment being pivotally mounted for movement into two positions in one of which it deflects the catheter in one lateral direction and in the other of which it deflects the catheter in the opposite lateral direction; and means controllable from a relatively remote point on said tube for moving said abutment.

11. In combination with a catheter tube, a movable abutment positioned across the outlet end thereof for encounter by a catheter advanced through the tube, said abutment being pivotally mounted for movement into two positions in one of which it deflects the catheter in one lateral direction and in the other of which it deflects the catheter in the opposite lateral direction; and means controllable from a relatively remote point on said tube for moving said abutment; said means including a pair of reach-rods paralleling the tube and pivoted at their forward ends to opposite portions of said abutment.

12. In combination with a catheter tube, a movable abutment positioned across the outlet end thereof for encounter by a catheter advanced through the tube, said abutment being pivotally mounted for movement into two positions in one of which it deflects the catheter in one lateral direction and in the other of which it deflects the catheter in the opposite lateral direction; and means controllable from a relatively remote point on said tube for moving said abutment; said means comprising a pair of reach-rods pivoted at their forward ends to opposite portions of said abutment, and an oscillatable bar medially pivoted to said tube and pivoted at opposite sides to the rear ends of said reach-rods respectively.

13. In combination with a catheter tube, a movable abutment positioned across the outlet end thereof for encounter by a catheter advanced through the tube, said abutment being pivotally mounted for movement into two positions in one of which it deflects the catheter in one lateral direction and in the other of which it deflects the catheter in the opposite lateral direction; and means controllable from a relatively remote point on said tube for moving said abutment; said means comprising a pair of reach-rods pivoted at their forward ends to opposite portions of said abutment, and an oscillatable bar medially pivoted to said tube and pivoted at opposite sides to the rear ends of said reach-rods respectively; the pivotal connections and arrangement of reach-rods being such that said oscillatable bar will always parallel said abutment.

14. A catheter tube having opposite portions of its outlet end extended to form opposed ears, and a catheter-deflecting abutment medially pivoted to said ears between the latter, said abutment being thereby in the path of a catheter advanced through said tube, whereby said abutment may be pivoted to control both the direction and extent of deflection of a catheter out of said outlet end.

15. A catheter tube having opposite portions of its outlet end extended to form opposed ears, a spindle mounted between said ears, a catheter-deflecting abutment having its midportion pivotally mounted on said spindle, and means at the rear end of the tube for oscillating said abutment and thereby deflecting an advanced catheter in one or the other lateral direction.

16. A catheterizing instrument comprising a catheter tube, means at the outlet end thereof for deflecting a catheter into a selected one of two opposite lateral directions, a telescope having at its inner end an objective which commands a lateral field of vision, and means for mounting the catheter tube alongside of the telescope and rotatably about the axis of the latter, whereby the telescope may be rotated about its axis to render the catheter visible in whatever direction the latter may be deflected.

17. A catheterizing instrument comprising a catheter tube, means at the outlet end thereof for deflecting a catheter into a selected one of two opposite lateral directions, a telescope having at its inner end an objective which commands a lateral field of vision, means for mounting the catheter tube alongside of the telescope and rotatably about the axis of the latter, whereby the telescope may be rotated about its axis to render the catheter visible in whatever direction the latter may be deflected; and means on the outer end of the telescope for indicating the extent of rotation thereof.

18. A catheterizing instrument comprising a catheter tube, means at the outlet end thereof for deflecting a catheter into a selected one of two opposite lateral directions, a telescope having at its inner end an objective which commands a lateral field of vision, means for mounting the catheter tube alongside of the telescope and rotatably about the axis of the latter, whereby the telescope may be rotated about its axis to render the catheter visible in whatever direction the latter may be deflected; and a pair of relatively movable markers on the outer end of the telescope for indicating the extent of rotation of the telescope with respect to the catheter tube axis.

19. As an attachment for a telescope having at its inner end an objective which commands a lateral field of vision and at its outer end a binding post rotatably mounted thereon; a catheter tube carrying a parallel sleeve, said sleeve being slidably applicable over the telescope, and means carried by the sleeve at the rear end thereof for removably engaging said binding post.

20. As an attachment for a telescope having at its inner end an objective which commands a lateral field of vision and at its outer end a binding post rotatably mounted thereon; a catheter tube carrying a parallel sleeve; said sleeve being slidably applicable over the telescope, and means carried by the sleeve at the rear end thereof for removably engaging said binding post; said catheter tube being provided at its outlet end with an oscillatable catheter-deflecting abutment, and control means mounted on the rear end of said sleeve for oscillating said abutment.

21. In a catheterizing instrument, the combination of a telescope having at its inner end an objective which commands a lateral field of vision, an oscillatable catheter-deflecting abutment over the outlet end of said catheter tube, a two-armed control member on the rear end of the catheter tube for oscillating said abutment so as to deflect a catheter in a desired direction, and means on the outer end of the telescope for indicating the position of the catheter tube axis relative to the field of vision; whereby the position of said two-armed member will indicate the direction of deflection of the catheter, and whereby the telescope may be rotated an indicated amount to render such catheter visible.

22. In a telescope provided with a lateral fenestrum, an objective adapted to command a field of vision outside of said fenestrum, said objective comprising a lens body having a concave light-receiving surface in said fenestrum and a rear plane surface oblique to the tube axis for internally reflecting said light rays rearwardly through the telescope.

23. In a telescope provided with a lateral fenestrum, an objective adapted to command a field of vision outside of said fenestrum, said objective comprising a lens body having a concave light-receiving surface in said fenestrum, a rear plane surface oblique to the tube axis for internally reflecting said light rays rearwardly through the telescope, and a convex surface through which said reflected rays leave said lens body.

24. In a telescope provided with a lateral fenestrum, an objective adapted to command a field of vision outside of said fenestrum, said objective comprising a hemispherical lens body positioned with its plane face forwardly and oblique to the tube axis, whereby one portion of the spherical surface lies across the telescope axis and an adjacent portion lies across said fenestrum, said last-named portion being concaved.

In witness whereof I have signed this specification this 16th day of April, 1929.

REINHOLD H. WAPPLER.